UNITED STATES PATENT OFFICE.

CHARLES C. ALLEN AND FRED G. ALLEN, OF SOUTH HADLEY FALLS, MASSACHUSETTS.

PUNCTURE-CLOSING COMPOUND FOR PNEUMATIC TIRES.

SPECIFICATION forming part of Letters Patent No. 599,115, dated February 15, 1898.

Application filed October 7, 1897. Serial No. 654,420. (No specimens.)

*To all whom it may concern:*

Be it known that we, CHARLES C. ALLEN and FRED G. ALLEN, citizens of the United States, and residents of South Hadley Falls, in the county of Hampshire and State of Massachusetts, have invented certain new and useful Improvements in Puncture-Closing Compounds for Pneumatic Tires, of which the following is a specification.

This invention relates to a new compound designed to be introduced into a pneumatic tire and to flow entirely around the inner wall thereof and to serve to close punctures and also to overcome porosity of the tire.

This compound, which is semiliquid in its consistency, consists, essentially, in graphite or plumbago which has been rendered to a fine condition and a sufficient quantity of glycerin, so that it will flow or run. These two ingredients form the base of the compound; but the same may be improved by the addition of asbestos in a comminuted condition and also by the addition of ground or pulverized magnesia or whiting or like mineral substance the character of which will be chemically unaffected by the glycerin. The graphite, being flaky in form, loads or packs in the puncture as carried therein by the agency of the glycerin.

While, as before stated, the essentials of the composition are the plumbago and glycerin, sufficient glycerin being mixed with the graphite to render it suitably coalescent and of about the consistency of molasses, and while this will serve to close punctures generally, it is preferred to add comminuted asbestos to the above-named ingredients and also to add the whiting or magnesia in a pulverized or very fine condition, for reasons which will be hereinafter set forth.

The graphite is combined with the comminuted asbestos and with the ground magnesia, in about equal proportions of each, the proportions being susceptible of quite wide variation without departure from this invention, and the whole is, with the sufficient quantity of the glycerin necessary to acquire the proper consistency, thoroughly mixed by stirring or agitation.

The asbestos is employed in the compound more especially for insuring that punctures in the tire of a considerable size may be closed, as this material being fibrous when under pressure has its fibers assume a bristling form, so that the different particles of the asbestos as seen microscopically constitute, so to speak, an "open-work" structure, into which the graphite loads or packs, and the pulverized magnesia, whiting, or like fine substance will enter the interstices between the flakes or particles of the graphite and form a close non-porous body.

While the whiting or ground magnesia may be most easily dispensed with and the next less necessary ingredient being the comminuted asbestos, the employment of both the asbestos and the pulverized magnesia, whiting, or like substance in combination with the essential materials, as stated, is advantageous and to be preferably employed.

The improved compound is introduced into the tire through the valve-tube or otherwise in a quantity sufficient to thoroughly cover the interior tire-wall at all portions, and the same may be distributed by whirling the tire or in the ordinary rotation thereof while on the wheel as ensues from riding.

The glycerin, being non-drying, will for an indefinite period serve as a carrier for the particles, or, as aforesaid, mixed therewith, and this flowing material will have no effect to injure the rubber composing the tire nor will it be injuriously affected by the latter.

What we claim, and desire to secure by Letters Patent, is—

1. A puncture-closing compound for tires consisting of finely-rendered graphite, comminuted asbestos in about equal proportions, and a sufficient quantity of glycerin, mixed therewith, to render the same semiliquid, as set forth.

2. The improved compound for closing punctures in tires herein described, the same being composed of finely-rendered graphite, comminuted asbestos, and a pulverized substance, as magnesia, whiting or the like, in about equal proportions, together with a sufficient quantity of glycerin to render the same semi-liquid, for the purpose set forth.

In testimony that we claim the foregoing as our invention we have signed our names, in presence of two witnesses, this 29th day of September, 1897.

CHARLES C. ALLEN.
FRED G. ALLEN.

Witnesses:
WILLIAM P. ALLEN,
WM. S. BELLOWS.